United States Patent
Ichihara et al.

(10) Patent No.: US 10,246,188 B2
(45) Date of Patent: Apr. 2, 2019

(54) APPARATUS FOR CONTROLLING STILL POSITION IN AIR

(71) Applicant: PRODRONE CO., LTD., Nagoya-shi, Aichi (JP)

(72) Inventors: Kazuo Ichihara, Nagoya (JP); Kiyokazu Sugaki, Nagoya (JP)

(73) Assignee: PRODRONE CO., LTD., Nagoya-shi (JP)

( * ) Notice: Subject to any disclaimer, the term of this patent is extended or adjusted under 35 U.S.C. 154(b) by 0 days.

(21) Appl. No.: 15/756,048

(22) PCT Filed: Aug. 30, 2016

(86) PCT No.: PCT/JP2016/075305
§ 371 (c)(1),
(2) Date: Feb. 27, 2018

(87) PCT Pub. No.: WO2017/038809
PCT Pub. Date: Mar. 9, 2017

(65) Prior Publication Data
US 2018/0251217 A1    Sep. 6, 2018

(30) Foreign Application Priority Data

Sep. 4, 2015  (JP) ................................. 2015-174620

(51) Int. Cl.
*B64C 39/02* (2006.01)
*B64C 27/08* (2006.01)
(Continued)

(52) U.S. Cl.
CPC ............ *B64C 39/024* (2013.01); *B64C 27/08* (2013.01); *B64C 39/02* (2013.01); *B64C 39/022* (2013.01);
(Continued)

(58) Field of Classification Search
CPC ... B64C 39/022; B64C 2201/148; B64F 3/00; A63H 27/002; A63H 27/04
See application file for complete search history.

(56) References Cited

U.S. PATENT DOCUMENTS 2,980,365 A * 4/1961 Lester ................... B64C 39/022
                                                244/17.17
3,148,847 A * 9/1964 Manificat .............. B64C 39/022
                                                244/17.17
(Continued)

FOREIGN PATENT DOCUMENTS

DE         733801 C      4/1943
JP     H06-110602 A      4/1994
(Continued)

OTHER PUBLICATIONS

Oct. 24, 2017 Office Action issued in Japanese Patent Application No. 2017-538042.
(Continued)

*Primary Examiner* — Richard R. Green
*Assistant Examiner* — Michael B. Kreiner
(74) *Attorney, Agent, or Firm* — Oliff PLC (57) ABSTRACT

An apparatus for controlling a still position in the air, allowing a miniature unmanned aerial vehicle equipped with a plurality of rotors to move swiftly to a given position in the air and make its airframe hover stably in that position, the apparatus including a miniature unmanned aerial vehicle equipped with a plurality of rotors, a stationary plane from which and on which the miniature unmanned aerial vehicle takes off and lands, and a plurality of string-like members which link the miniature unmanned aerial vehicle with the stationary plane, wherein the plurality of string-like members are stretched to a length for all the members to become tense when the miniature unmanned aerial vehicle has come to a specified position which is a given position in the air.

(Continued)

Also, it is preferable that the plurality of string-like members include at least three string-like members.

7 Claims, 9 Drawing Sheets

(51) Int. Cl.
    *B64D 27/24*     (2006.01)
    *B64F 3/00*     (2006.01)
    *G05D 1/08*     (2006.01)
    *B64D 47/08*     (2006.01)

(52) U.S. Cl.
    CPC ............... *B64D 27/24* (2013.01); *B64F 3/00* (2013.01); *G05D 1/08* (2013.01); *B64C 2201/024* (2013.01); *B64C 2201/042* (2013.01); *B64C 2201/06* (2013.01); *B64C 2201/123* (2013.01); *B64C 2201/148* (2013.01); *B64D 47/08* (2013.01)

(56) References Cited

U.S. PATENT DOCUMENTS

| | | | | |
|---|---|---|---|---|
| 4,981,456 | A * | 1/1991 | Sato | A63H 27/04 244/17.13 |
| 6,781,254 | B2 * | 8/2004 | Roberts | F03D 13/20 290/55 |
| 7,109,598 | B2 * | 9/2006 | Roberts | F03D 1/025 290/44 |
| 7,364,114 | B2 * | 4/2008 | Wobben | B64C 27/20 244/12.3 |
| 8,350,403 | B2 * | 1/2013 | Carroll | B64C 39/022 290/55 |
| 8,602,349 | B2 * | 12/2013 | Petrov | B64C 39/022 244/17.23 |
| 8,876,571 | B2 * | 11/2014 | Trowbridge | A63H 27/12 446/454 |
| 9,109,575 | B2 * | 8/2015 | Weddendorf | F03D 5/00 |
| 9,718,543 | B2 * | 8/2017 | Duffy | B64C 39/022 |
| 2011/0180667 | A1 | 7/2011 | O'Brien et al. | |
| 2015/0041598 | A1 | 2/2015 | Nugent et al. | |
| 2016/0299504 | A1 * | 10/2016 | Hsiao | G05D 1/102 |
| 2017/0036777 | A1 * | 2/2017 | Martin | B64F 1/12 |

FOREIGN PATENT DOCUMENTS

| | | |
|---|---|---|
| JP | 3185081 B2 | 7/2001 |
| JP | 2010-058779 A | 3/2010 |
| JP | 2010-208623 A | 9/2010 |
| JP | 2014-169038 A | 9/2014 |
| KR | 2011-0015153 A | 2/2011 |
| WO | 2013/052178 A2 | 4/2013 |
| WO | 2014/203593 A1 | 12/2014 |
| WO | 2014/204116 A1 | 12/2014 |

OTHER PUBLICATIONS

Dec. 12, 2017 Decision to Grant a Patent issued in Japanese Patent Application No. 2017-538042.
Dec. 6, 2016 Search Report issued in International Patent Application No. PCT/JP2016/075305.

* cited by examiner

APPARATUS FOR CONTROLLING STILL POSITION IN AIR

TECHNICAL FIELD

The present invention relates to an apparatus for controlling a still position in the air and, more particularly, to a technology for causing a miniature unmanned aerial vehicle equipped with a plurality of rotors to hover stably in a desired position in the air.

BACKGROUND ART

Conventionally, miniature unmanned aerial vehicles (UAVs) which are typified by unmanned helicopters for industrial use have been expensive and hard to obtain and manipulative skills have been needed to make them fly stably. However, the prices of such UAVs have fallen recently, because acceleration sensors and angular velocity sensors, which have high performance and are easy to handle, as well as microcontrollers or the like have become available at moderate prices, and in addition maneuverability has improved dramatically, since many operations to control and manipulate the UAV airframe have been automated. Against this background, attempts are now made to apply, especially, miniature multicopters to diverse missions in a wide range of fields, not only for hobby purposes.

A multicopter is one type of helicopter in which a plurality of rotors are installed and is a rotorcraft flying, while keeping balance of the airframe by controlling the rotating speed of each of these rotors. Since a multicopter can employ a propeller with a simpler structure than that of a helicopter, the multicopter is easy to maintain and its airframe can be built at comparatively low cost.

CITATION LIST

Patent Literature

PTL1: JP 2010-058779 A

SUMMARY OF INVENTION

Technical Problem

Even though a large portion of multicopter airframe control is automated, proper skills of manipulating or piloting and maintaining the multicopter and commensurate airframe performance are demanded in order to make a multicopter to fly as intended by a manipulator. If these skills and performance are inadequate, a piloting error and poor maintenance of the airframe or external factors such as strong wind may result in the multicopter flying away out of sight or out of range of communication. This is also true when a multicopter is caused to fly autonomously according to a program.

For instance, in a case where a multicopter with image capturing equipment or measurement equipment installed therein is caused to stay still in a given position in the air and image capturing or measurement from that position is performed for a long time, it is needed to move the multicopter swiftly to the given position and make the multicopter hover so that it will stay in the same position for a long time. It is not easy to perform such flight stably.

In consideration of the problem noted above, a problem to be solved by the present invention resides in providing an apparatus for controlling a still position in the air, the apparatus allowing a miniature unmanned aerial vehicle equipped with a plurality of rotors to move swiftly to a given position in the air and make its airframe hover stably in that position.

Solution to Problem

To solve the foregoing problem, an apparatus for controlling a still position in the air according to the present invention includes a miniature unmanned aerial vehicle equipped with a plurality of rotors, a stationary plane from which and on which the miniature unmanned aerial vehicle takes off and lands, and a plurality of string-like members which link the miniature unmanned aerial vehicle with the stationary plane, wherein the plurality of string-like members are stretched to a length for all the members to become tense when the miniature unmanned aerial vehicle has come to a specified position which is a given position in the air.

The miniature unmanned aerial vehicle is linked to the stationary plane with the plurality of string-like members and the length of these string-like members is adjusted so that all the members will become tense when the miniature unmanned aerial vehicle has come to a specified position; thus, the airframe is guided by these string-like members to the specified position only by causing the miniature unmanned aerial vehicle to ascend vertically from the stationary plane. In addition, since these string-like members are tense at the specified position, upper thrust that is further generated by the miniature unmanned aerial vehicle in the specified position makes the miniature unmanned aerial vehicle and the stationary plane pull each other in opposite directions. This prevents the miniature unmanned aerial vehicle from easily moving off the specified position. In other words, it is possible to cause the miniature unmanned aerial vehicle to hover stably in the specified position.

Furthermore, since the miniature unmanned aerial vehicle according to the present invention is linked to the stationary plane with the string-like members, it does not happen that the miniature unmanned aerial vehicle flies away out of sight or out of range of communication due to a piloting error, airframe failure, or strong wind, among others.

It is also preferable that the plurality of string-like members include at least three string-like members.

By anchoring the miniature unmanned aerial vehicle with at least three string-like members, the vehicle can be fixated in the specified position at one point in the air.

It is also preferable that a power line for supplying electric power to the miniature unmanned aerial vehicle or a signal line for transmitting and receiving signals to/from the miniature unmanned aerial vehicle is included in the plurality of string-like members.

By including the signal line or the power line in the plurality of string-like members, it is possible to cause the miniature unmanned aerial vehicle to hover stably in the specified position, and in addition, for example, a limitation of flight time entailed by the battery capacity is removed and it can be prevented that wireless communication with the miniature unmanned aerial vehicle is affected by noise.

It is also preferable that the apparatus further includes a plurality of winding machines which are placed on the stationary plane for each of the string-like members and deliver and wind each of the string-like members, a winding controller which integrally manages operations of the plurality of winding machines, and a slack detecting device which detects slack of the plurality of string-like members, wherein, when the slack detecting device detects slack of any of the plurality of string-like members, the winding controller causes all the winding machines to perform a winding operation until the slack string-like member becomes tense.

In a configuration such that the respective string-like members are connected to the stationary plane via the winding machines, and when slack of any string-like member has been detected, all the string-like members are wound until the slack string-like member becomes tense, it is possible to modify a shift of the flight position of the miniature unmanned aerial vehicle in a horizontal direction. Moreover, it is possible to prevent the miniature unmanned aerial vehicle from falling outside a take-off and landing area which is delimited by a circular imaginary line connecting each winding machine and its neighboring winding machine.

It is also preferable that, when the slack string-like member does not become tense even though the slack string-like member has been wound by a predetermined length, the winding controller increases the speed of winding of all the winding machines.

If the slack is not corrected even though the slack string-like member has been wound by a predetermined length, by judging it highly probable that the miniature unmanned aerial vehicle has malfunctioned or fallen and pulling the miniature unmanned aerial vehicle back into the take-off and landing area soon, it would become possible to minimize damage resulting from such trouble.

It is also preferable that a juncture to which the plurality of string-like members are linked is provided on an undersurface of the miniature unmanned aerial vehicle, the juncture is a part of the slack detecting device, and the juncture is able to tilt in a direction in which it is pulled by the plurality of string-like members.

Since the respective string-like members are linked to the juncture provided on an undersurface of the miniature unmanned aerial vehicle, the juncture will be pulled unevenly by the string-like members when the flight position of the miniature unmanned aerial vehicle shifts off the specified position in a horizontal direction. Thereby, the juncture will tilt in a direction toward which the miniature unmanned aerial vehicle is to return, which makes it possible to indicate a direction of the positional shift of the miniature unmanned aerial vehicle in a horizontal direction and a slack string-like member.

It is also preferable that the winding controller and the slack detecting device are provided in the miniature unmanned aerial vehicle, and the miniature unmanned aerial vehicle and the plurality of winding machines are connected with the signal line so as to be able to communicate with each other.

Since the miniature unmanned aerial vehicle and each of the winding devices are linked with the signal line, when slack of any string-like member is detected, it would become possible to issue an instruction to correct the slack directly from the miniature unmanned aerial vehicle to each winding machine.

Advantageous Effects of Invention

As described above, according to the apparatus for controlling a still position in the air pertaining to the present invention, it would become possible to move a miniature unmanned aerial vehicle equipped with a plurality of rotors swiftly to a given position in the air and make its airframe hover stably in that position.

DESCRIPTION OF EMBODIMENTS

In the following, with the aid of the drawings, detailed descriptions are provided about embodiments of the apparatus for controlling a still position in the air pertaining to the present invention. The apparatus for controlling a still position in the air according to an embodiment disclosed herein is a monitoring apparatus that causes a miniature unmanned aerial vehicle to ascend to a given altitude and monitors surroundings from that position using a camera or a measuring instrument. The apparatus for controlling a still position in the air may be actuated based on a predetermined cyclic period or may be actuated unperiodically at arbitrary timing specified by a manipulator.

First Embodiment

Figure 1:
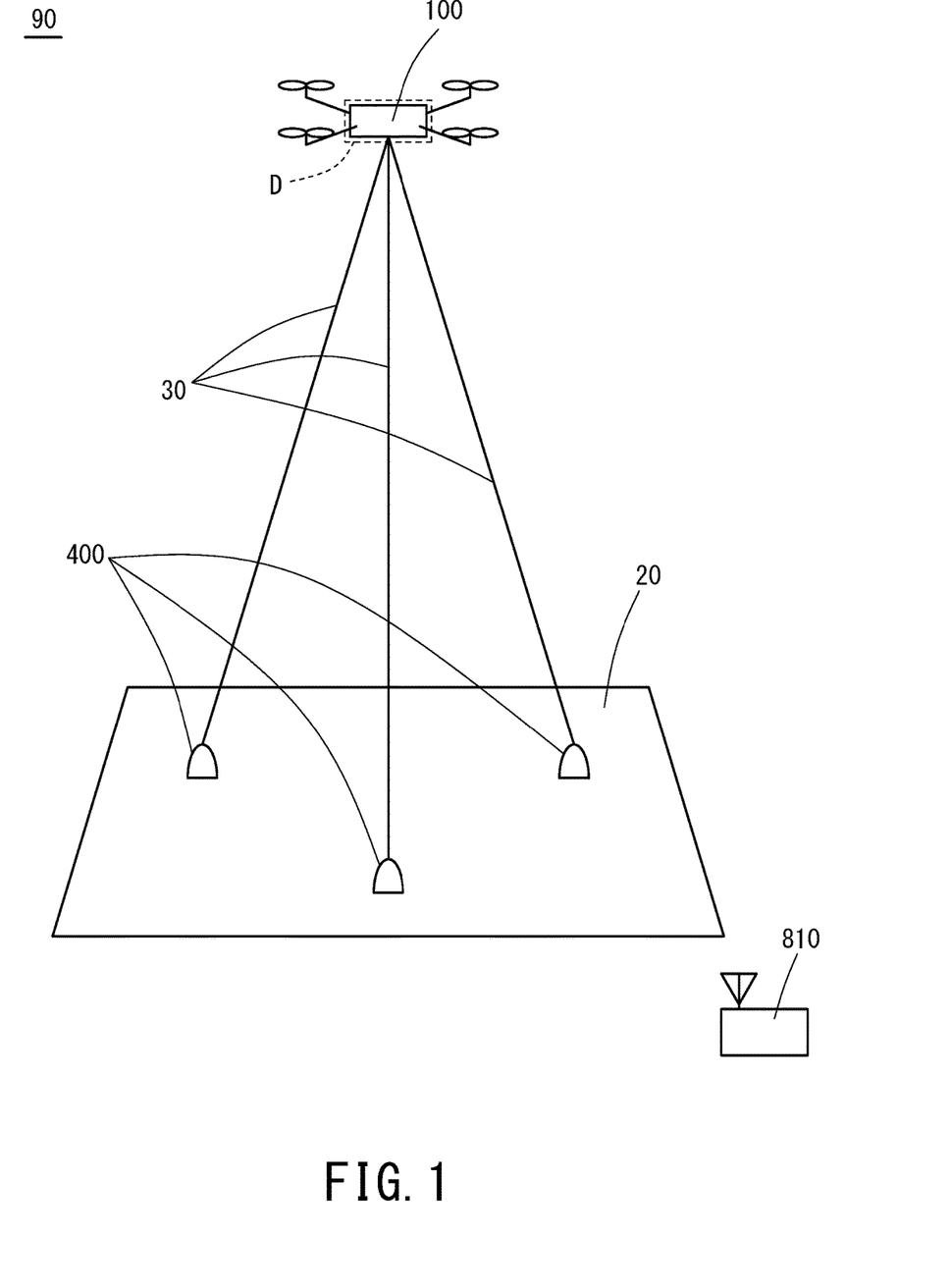
FIG. 1 is a schematic diagram depicting an external view of an apparatus for controlling a still position in the air pertaining to a first embodiment.

FIG. 1 is a schematic diagram depicting an external view of an apparatus for controlling a still position in the air pertaining to a first embodiment of the present invention. The apparatus 90 for controlling a still position in the air includes a multicopter 100 (a miniature unmanned aerial vehicle) equipped with a plurality of rotors, a stationary plane 20 from which and on which the multicopter 100 takes off and lands, three wires 30 (string-like members) which link the multicopter 100 with the stationary plane 20, and a transceiver 810 for piloting the multicopter 100 by radio. Also, the length of each wire 30 is adjusted to such a length that all the wires will become tense when the multicopter 100 has come to a specified position D which is a given position in the air.

Here, the stationary plane 20 refers to a stationary plane that cannot be moved easily even by exerting external force on it, for example, such as the ground surface or the roof of a building. The stationary plane 20 does not necessarily have to be a level plane and even an uneven plane or even an inclined plane may be used as the stationary plane 20 by adjusting the length of each wire 30.

Also, three winding machines 400 for delivering and winding the wires 30 are placed on the stationary plane 20 and ends of the respective wires 30 terminating at the stationary plane 20 are connected to the winding machines 400. The winding machines 400 are small winches which are provided with an auto-tension function and draw the wires 30 in a winding direction with constant tension at all times. Tension of the wires 30 is adjusted, of course, to be smaller than lift that the multicopter 100 can output. In addition, the winding machines 400 are not requisite components and the respective wires 30 may be directly connected to the stationary plane 20.

Figure 2:
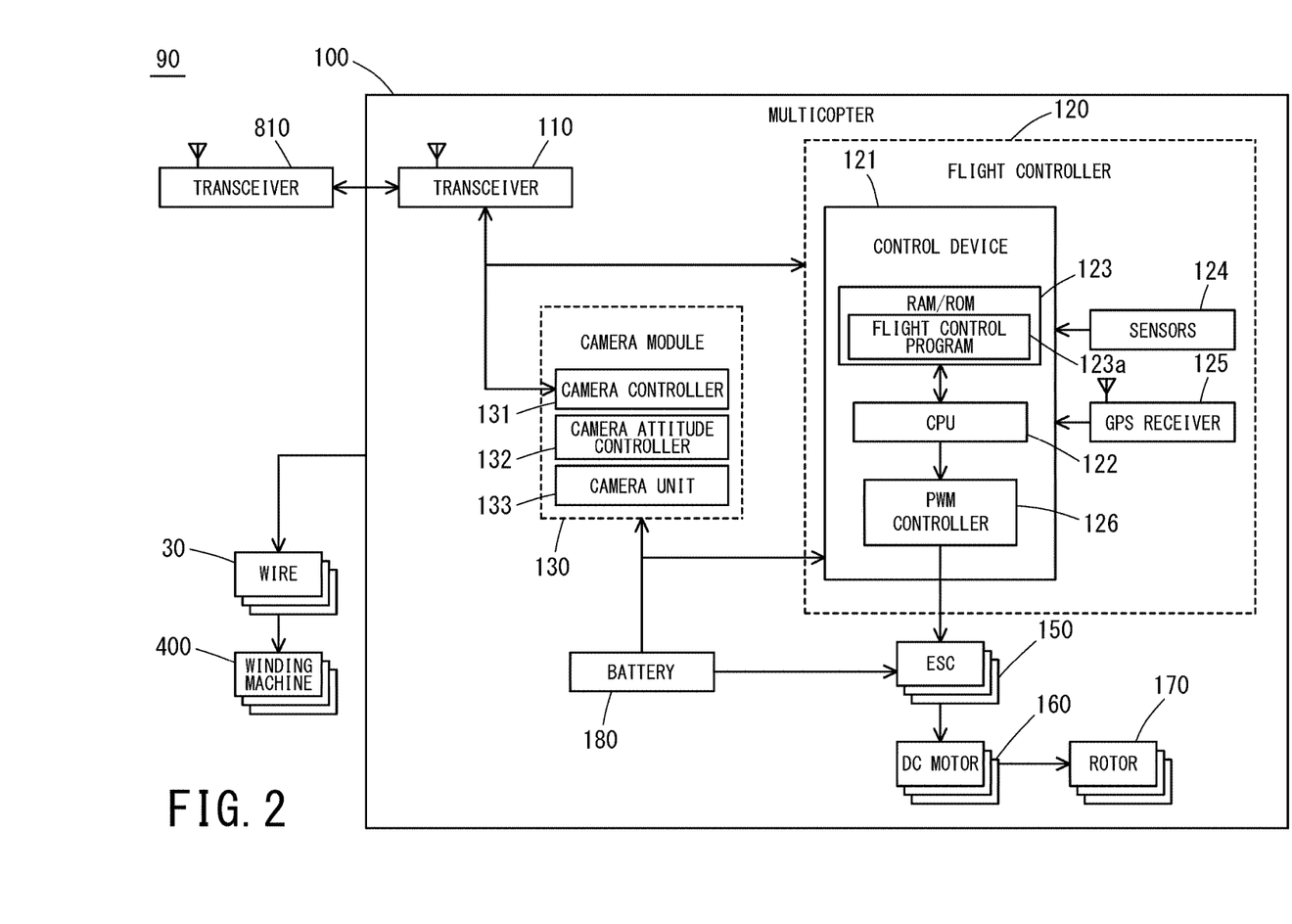
FIG. 2 is a block diagram depicting a functional configuration of the apparatus for controlling a still position in the air pertaining to the first embodiment.

FIG. 2 is a block diagram depicting a functional configuration of the apparatus 90 for controlling a still position in the air. The multicopter 100 is comprised mainly of a flight controller 120 which controls the attitude and flying operations of the multicopter 90 in the air, a plurality of rotors 170 which rotate to generate lift for the multicopter 100, a camera module 130 which captures images of the surroundings of the multicopter 100, a transceiver 110 for wireless communication with the manipulator (the transceiver 810), and a battery 180 which supplies electric power to these components.

The flight controller 120 includes a control device 121 which is a microcomputer. The control device 121 includes a CPU 122 which is a central processing unit, a RAM/ROM 123 which is a storage device, and a PWM controller 126 which transmits control signals for DC motors 160 to ESCs (Electric Speed Controllers) 150. The DC motors 160 are a plurality (four in the present embodiment) of outer rotor type DC brushless motors and a rotor 170 is installed on the output shaft of each DC motor 160. The ESCs 150 are placed for each DC motor 160 and each ESC 150 causes each DC motor 160 to rotate at a speed commanded from the PWM controller 126.

The flight controller 120 also includes a suite of sensors 124 and a GPS receiver 125 which are connected to the control device 121. The suite of sensors 124 of the multicopter 100 includes an acceleration sensor, a gyroscope sensor (an angular velocity sensor), an atmospheric pressure sensor, a geomagnetic sensor (an electronic compass), etc. Through the suite of these sensors 124 and the GPS receiver 125, the control device 121 is able to acquire a current position including latitude, longitude and altitude of the multicopter 100.

In the RAM/ROM 123 of the control device 121, a flight control program 123a is stored in which a flight control algorithm for the multicopter 100's flight is programmed. Using this program 123a and information acquired from the suite of sensors 124, the control device 121 controls the attitude of the multicopter 100 so as to be steady. Manipulating the apparatus 90 for controlling a still position in the air may be performed manually by the manipulator or may be performed automatically by an autonomous flight program which should separately be registered beforehand in the RAM/ROM 123 of the control device 121. Now, the apparatus 90 for controlling a still position in the air according to the present invention can guide a miniature unmanned aerial vehicle to a specified position by means of the string-like members, and therefore, it is conceivable to dispense with the suite of sensors 124 and the GPS receiver 125.

The multicopter 100 is also equipped with the camera module 130 which captures images of the surroundings of the multicopter 100. The camera module 130 is comprised of a camera controller 131 which accepts an instruction from the manipulator (the transceiver 810), a camera attitude controller 132 which changes the orientation of a camera unit 133 in circumferential and vertical directions and corrects jiggling of the camera unit 133 as instructed by the camera controller 131, and the camera unit 133 which captures images of a scene in a direction toward which it is oriented by the camera attitude controller 132. Manipulating the camera module 130 may be performed manually by the manipulator or may be performed automatically by an autonomous image capturing program which has been registered in the camera controller 131 and which is run by a microcontroller employed for the camera controller 131.

Now, since the apparatus for controlling a still position in the air in the present embodiment is used as a monitoring apparatus, the camera module 130 (a measuring instrument module 140 in a third embodiment) is installed; however, the camera module 130 and the measuring instrument module 140 are not requisite components. As other applications of the present invention, various applications are conceivable; for example, use for Public Address by installing a loudspeaker or use as lightwave navigation like a lighthouse by installing a light source.

The multicopter 100 is linked to the stationary plane 20 with the three wires 30 and the length of the wires is adjusted so that all these wires 30 become tense when the multicopter 100 has come to a specified position D; this makes it possible to guide the multicopter 100 to the specified position D only by causing the multicopter 100 to ascend vertically from the stationary plane 20. For instance, if the ascending multicopter 100 sways by wind and shifts its position in a horizontal direction from the specified position D, only some of the wires 30 become tense earlier. Accordingly, a range in which the multicopter 100 can move is limited to along an arc that is drawn by the upper end of the wire 30 having become tense (the end of the wire 30 terminating at the multicopter 100). The specified position D is an intersection point of arcs that are drawn by the upper ends of the tense wires 30 respectively and this intersection point is at the highest position in the range in which the multicopter 100 can move. Hence, as the multicopter 100 continues to ascend, the multicopter 100 is to be guided to the specified position D while going along any arc.

In addition, all these wires 30 are tense at the specified position D. Hence, upward thrust that is further generated by the multicopter 100 in the specified position D allows to make the multicopter 100 and the stationary plane 20 pull each other in opposite directions. This makes it possible to prevent the multicopter 100 from easily moving off the specified position. In other words, it is possible to cause the multicopter 100 to hover stably in the specified position D.

Furthermore, since the multicopter 100 is linked to the stationary plane 20 with the wires 30, the multicopter 100 is prevented from flying away out of sight or out of range of communication due to a piloting error, airframe failure, or strong wind, among others.

Now, in the apparatus 90 for controlling a still position in the air, the multicopter 100 is linked with three wires 30 so that it is fixated in the specified position D at one point in the air. The number of the wires 30 is not limited to three; alternatively it may be two wires, for example, if it is permissible that the specified position D falls within a linear range in the air or conversely four wires or more.

Second Embodiment

Figure 3:
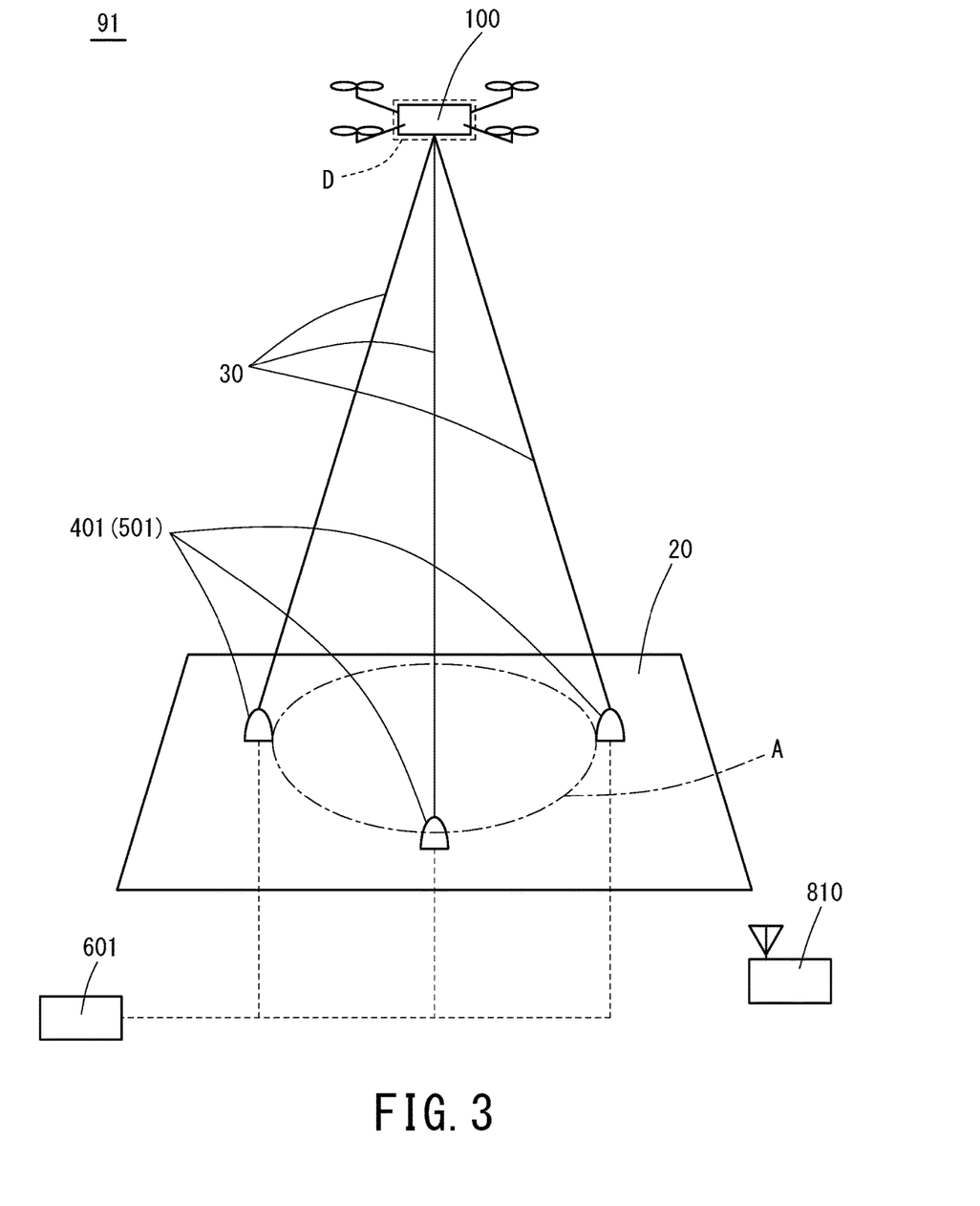
FIG. 3 is a schematic diagram depicting an external view of an apparatus for controlling a still position in the air pertaining to a second embodiment.
Figure 4:
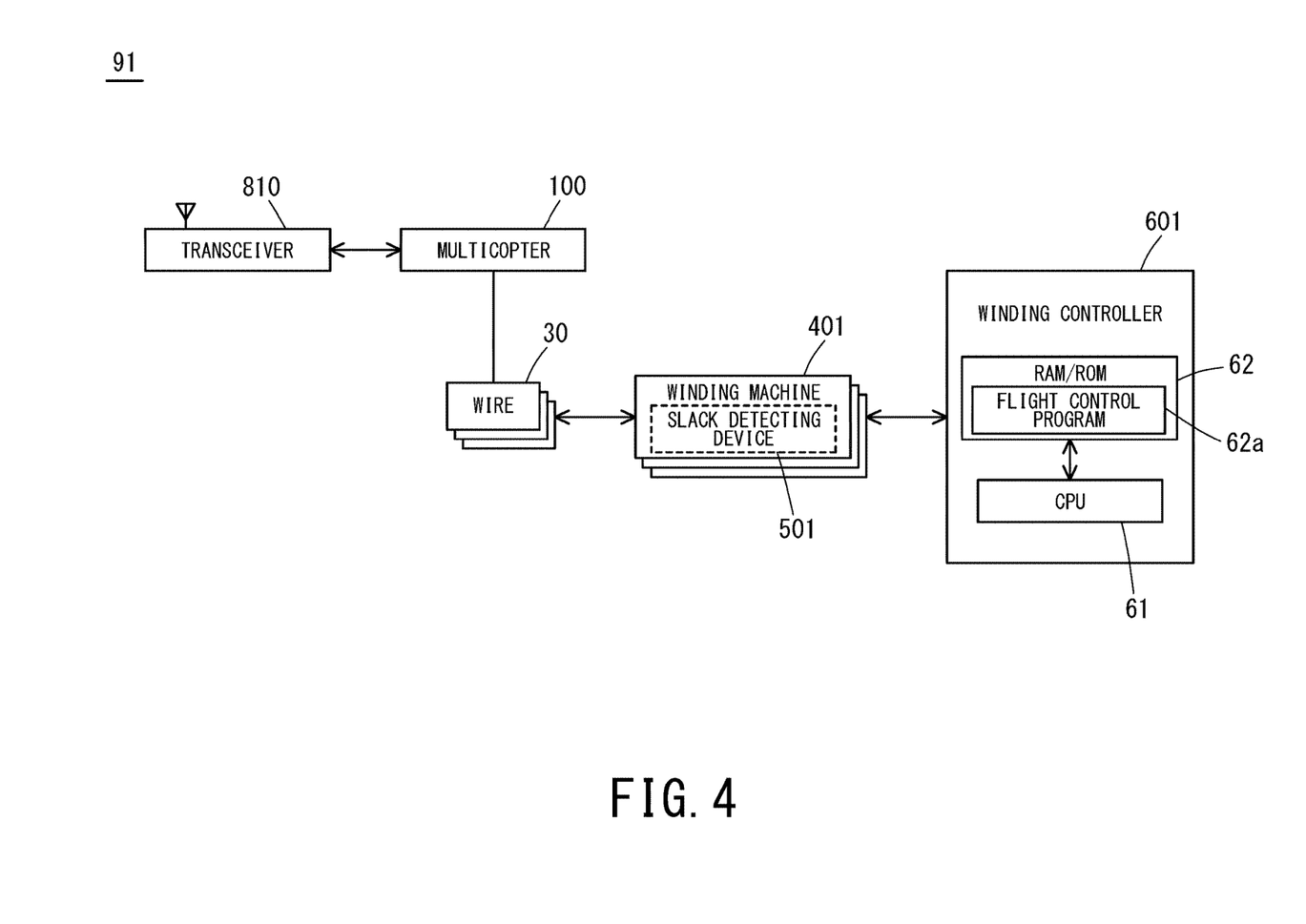
FIG. 4 is a block diagram depicting a functional configuration of the apparatus for controlling a still position in the air pertaining to the second embodiment.

The following describes a second embodiment pertaining to the apparatus for controlling a still position in the air according to the present invention. FIG. 3 is a schematic diagram depicting an external view of the apparatus 91 for controlling a still position in the air pertaining to the second embodiment of the present invention. FIG. 4 is a block diagram depicting a functional configuration of the apparatus 91 for controlling a still position in the air. Now, in the following description, a component having a similar or the same function as in the foregoing embodiment is assigned the same reference designator as in the foregoing embodiment and its detailed description is omitted.

The apparatus 91 for controlling a still position in the air has a slack detecting device 501 which detects slack of the wires 30 incorporated in each of winding machines 401 for delivering and winding each wire 30, and the apparatus is equipped with a winding controller 601 which integrally manages operations of these winding machines 401. Now, the configuration of the multicopter 100 is the same as that of the apparatus 90 for controlling a still position in the air according to the first embodiment.

The winding machines 401 are small winches which are provided with an auto-tension function and draw the wires 30 in a winding direction with constant tension at all times. Tension of the wires 30 is adjusted to be smaller than lift that the multicopter 100 can output; in this respect, the winding machines 401 are the same as the winding machines 400 in the first embodiment. Also the winding machines 401 are electrically driven winches and can be caused to perform a wire winding operation at arbitrary timing and speed, as commanded from the winding controller 601.

In the apparatus 91 for controlling a still position in the air, a slack detecting device 501 is incorporated in each winding machine 401. The slack detecting device 501 is a device which detects that the winding machine 401 performs a wire delivering or winding operation through, e.g., a rotary encoder or the like and notifies the winding controller 601. That is, detecting slack of a wire 30 in the apparatus 91 for controlling a still position in the air is implemented with cooperation of the slack detecting device 501 and the winding controller 601.

Now, "slack of a string-like member" mentioned in the present invention not only refers to a slack state of a string-like member, but also implies a condition where one of the wires 30 being delivered is shorter than an expected length to which the wire is to be delivered in comparison with the length to which other wires 30 have been delivered (the one of the wires 30 is not pulled sufficiently, that is, it is regarded as slack), if a component to prevent slack from occurring in a wire 30, e.g., like the winding machine 401, is provided.

The winding controller 601 is a microcontroller including a CPU 61 and a RAM/ROM 62. In the RAM/ROM 62, a winding control program 62a is stored in which a flight position modifying algorithm for the multicopter 100 to be described hereinafter is programmed.

Figure 9A:
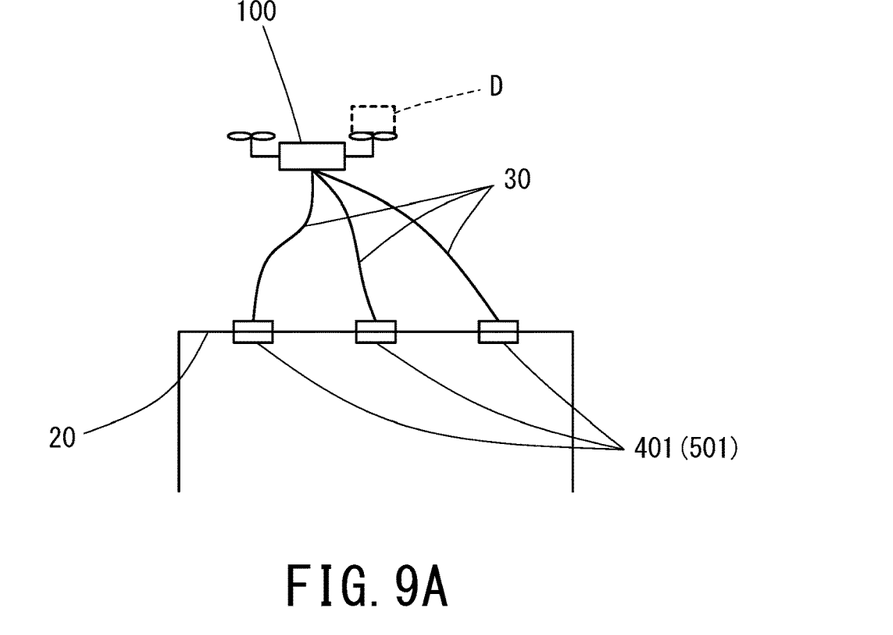
FIG. 9 is an explanatory diagram illustrating a flight position modifying procedure for the multicopter by the winding controller.
Figure 9B:
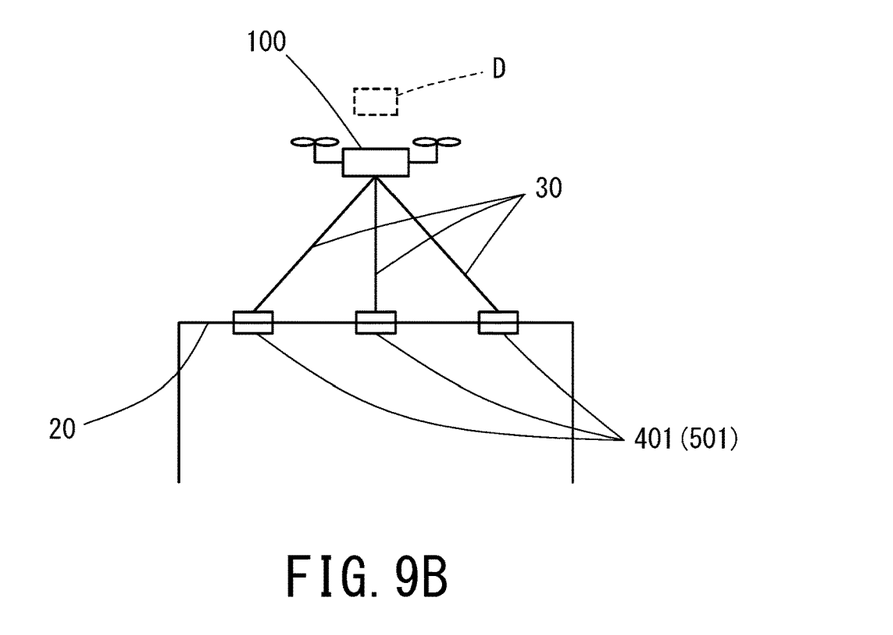

FIG. 9 is an explanatory diagram illustrating a flight position modifying procedure for the multicopter 100 by the winding controller 601 (winding control program 62a). When slack of any of the wires 30 has been detected by notification from a slack detecting device 501 (FIG. 9(a)), the winding controller 601 causes all the winding machines 401 to perform a winding operation until the slack wire 30 becomes tense (FIG. 9(b)).

When slack of any of the wires 30 is detected, by winding all the wires 30 to a length for the slack wire 30 to become tense, it is possible to modify a shift of the flight position of the multicopter 100 in a horizontal direction. Moreover, it is possible to prevent the multicopter 100 from falling outside a take-off and landing area A (see FIG. 3) which is delimited by a circular imaginary line A connecting each winding machine 401 and its neighboring winding machine 401.

Furthermore, when the slack wire 30 does not become tense even though it has been wound by a predetermined length (e.g., 2 to 3 m), the winding controller 601 increases the speed of winding of all the winding machines 401.

If the slack is not corrected even though the wire 30 has been wound by a predetermined length, then it is considered to be highly probable that the multicopter 100 has malfunctioned or fallen. Hence, by increasing the speed of winding of all the winding machines 401 to pull the multicopter 100 back into the take-off and landing area A soon, it is possible to minimize damage resulting from such trouble.

Third Embodiment

Figure 5:
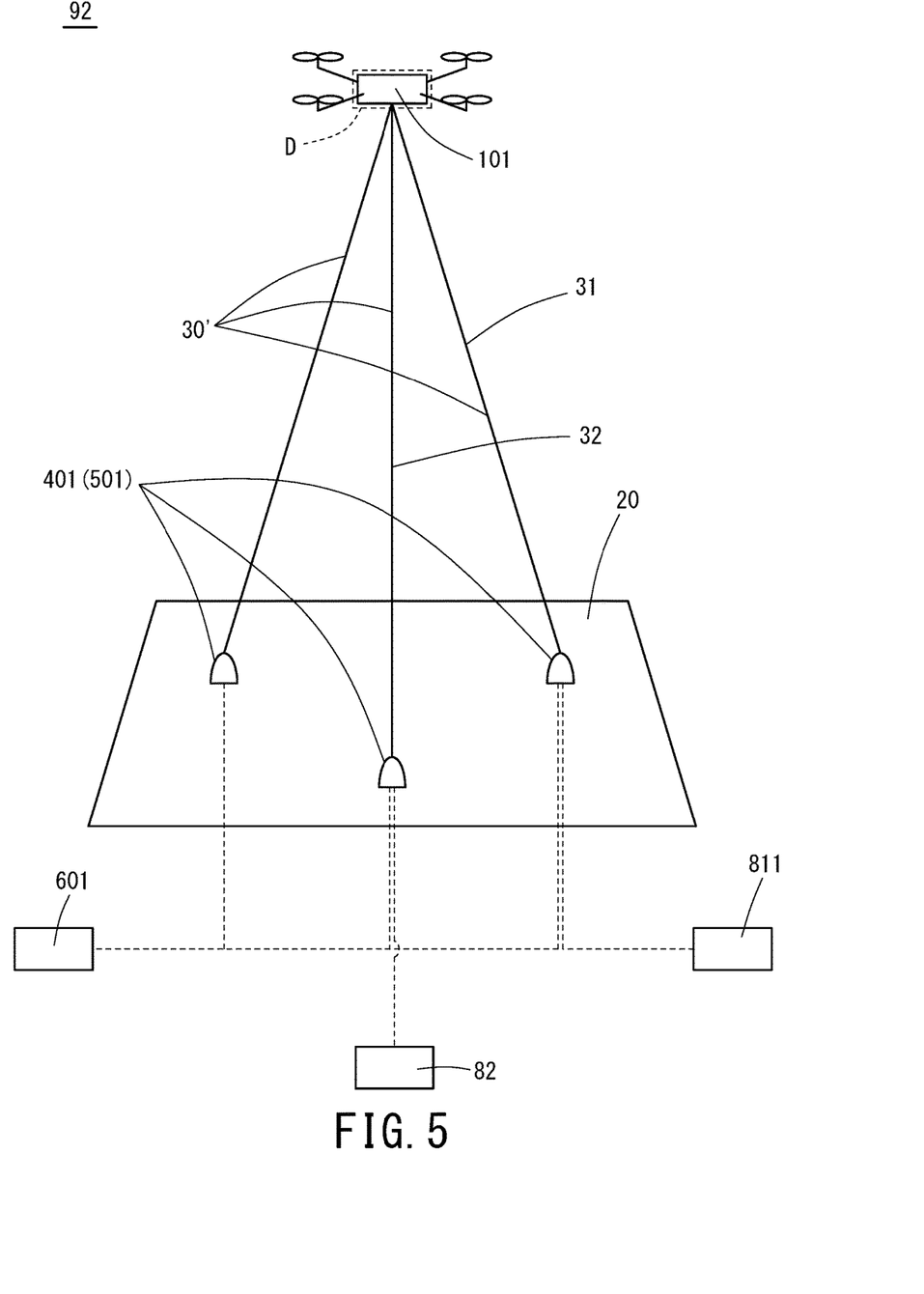
FIG. 5 is a schematic diagram depicting an external view of an apparatus for controlling a still position in the air pertaining to a third embodiment.
Figure 6:
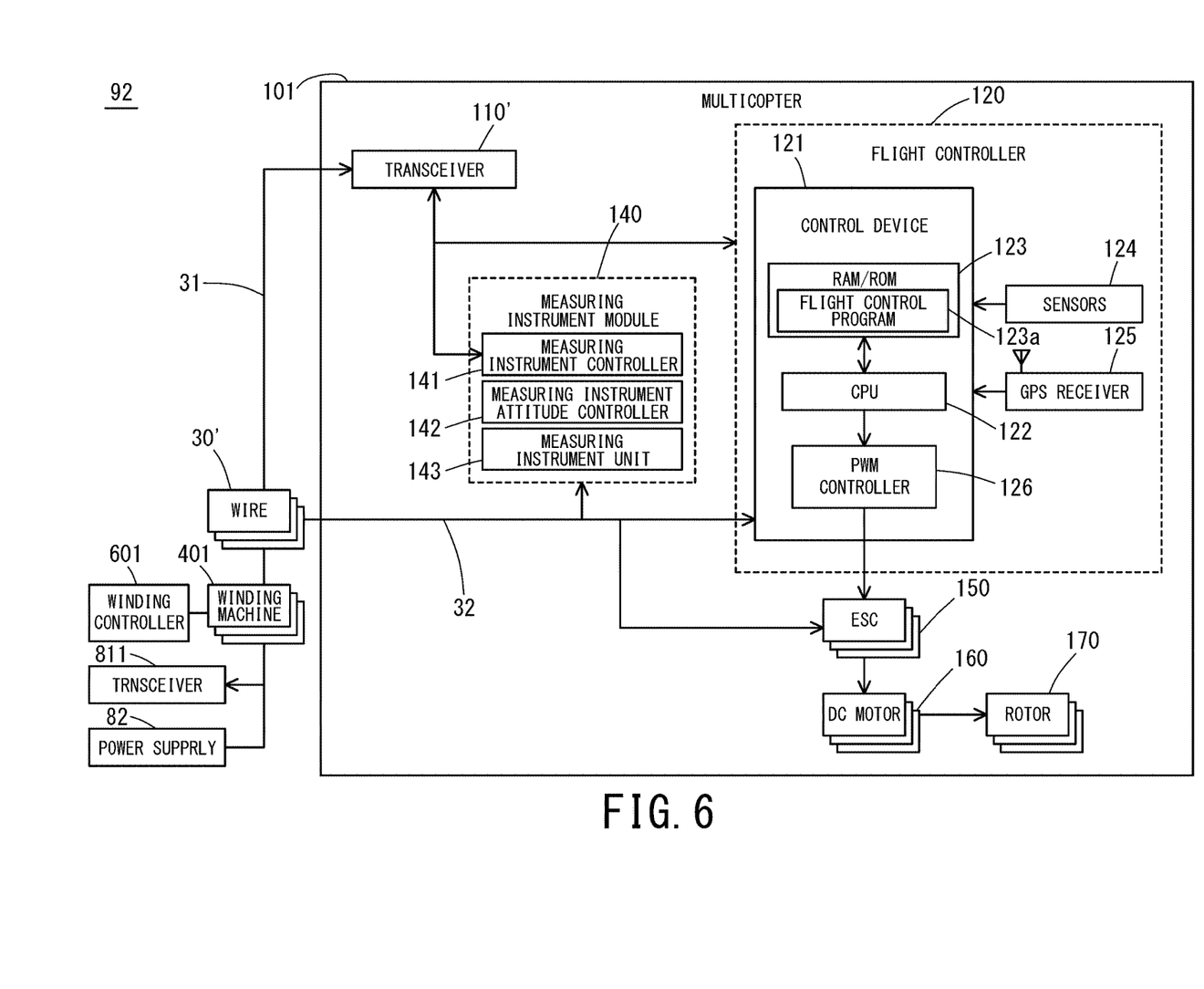
FIG. 6 is a block diagram depicting a functional configuration of the apparatus for controlling a still position in the air pertaining to the third embodiment.

The following describes a third embodiment pertaining to the apparatus for controlling a still position in the air according to the present invention. FIG. 5 is a schematic diagram depicting an external view of the apparatus 92 for controlling a still position in the air pertaining to the third embodiment of the present invention. FIG. 6 is a block diagram depicting a functional configuration of the apparatus 92 for controlling a still position in the air. Now, in the following description, a component having a similar or the same function as in the foregoing embodiments is assigned the same reference designator as in the foregoing embodiments and its detailed description is omitted.

A basic configuration of the apparatus 92 for controlling a still position in the air is the same as the apparatus 91 for controlling a still position in the air according to the second embodiment. Unlike the apparatus 91 for controlling a still position in the air, a measuring instrument module 140 instead of the camera module 130 (see FIG. 2) is installed in the apparatus 92 for controlling a still position in the air. As measuring instruments which may be used in the measuring instrument module 140, for example, an atmospheric component analyzer, an infrared camera, a radio wave measuring instrument, etc. are conceivable, but not limited to them.

The measuring instrument module 140 is comprised of a measuring instrument controller 141 which accepts an instruction from the manipulator (the transceiver 811), a measuring instrument attitude controller 142 which changes the orientation of a measuring instrument unit 143 in circumferential and vertical directions as instructed by the measuring instrument controller 141, and the measuring instrument unit 143 which performs measurement in a direction toward which it is oriented by the measuring instrument attitude controller 142. Manipulating the measuring instrument module 140 may be performed manually by the manipulator or may be performed automatically by an autonomous measurement program registered in the measuring instrument controller 141 and run by a microcontroller which is employed in the measuring instrument controller 141.

In addition, in the apparatus 92 for controlling a still position in the air, a power line 32 for supplying electric power to the multicopter 101 and a signal line 31 for the manipulator (the transceiver 811) to transmit and receive signals to/from the multicopter 101 are included in the wires 30' linking the multicopter 101 with the stationary plane 20. By including the signal line 31 and the power line 32 in the wires 30, it is possible to cause the multicopter 101 to hover stably in the specified position D, and in addition, a limitation of flight time entailed by the battery capacity is removed and influence of noise on communication between the manipulator (the transceiver 811) and the multicopter 101 (the transceiver 110') is suppressed.

Instead of the wires 30, the power line 32 and the signal line 31 alone may be connected with the multicopter 101. However, if there are concerns about strength of these power line 32 and signal line 31, they may be connected separately from the wires 30. That is, a configuration may be such that the multicopter 101 and the stationary plane 20 are linked with three wires 30 as in the case for the foregoing embodiments, and the signal line 31 running together with one of the wires and the power line 32 running together with another one of the wires are connected with the multicopter 101.

Fourth Embodiment

Figure 7:
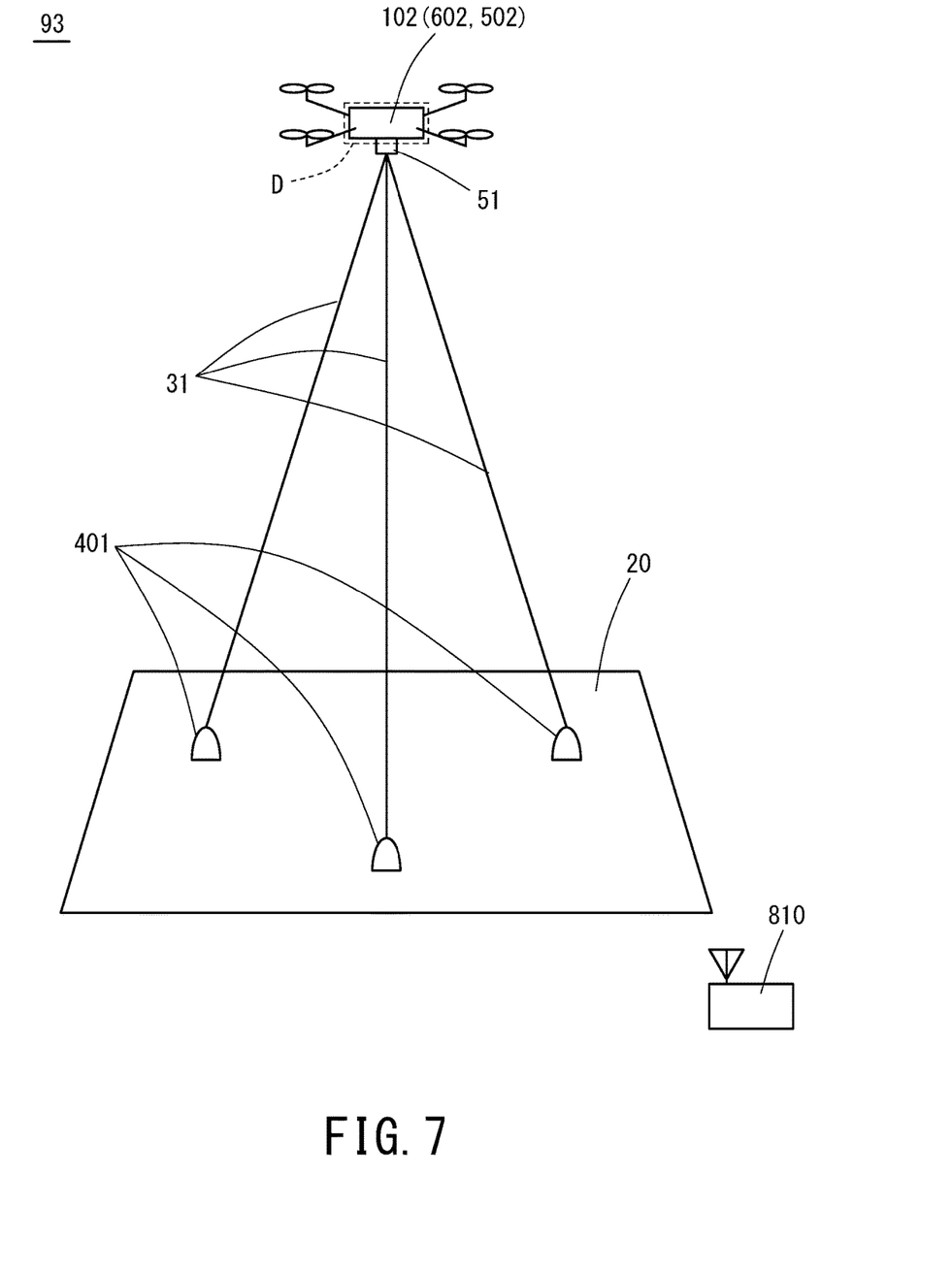
FIG. 7 is a schematic diagram depicting an external view of an apparatus for controlling a still position in the air pertaining to a fourth embodiment.
Figure 8:
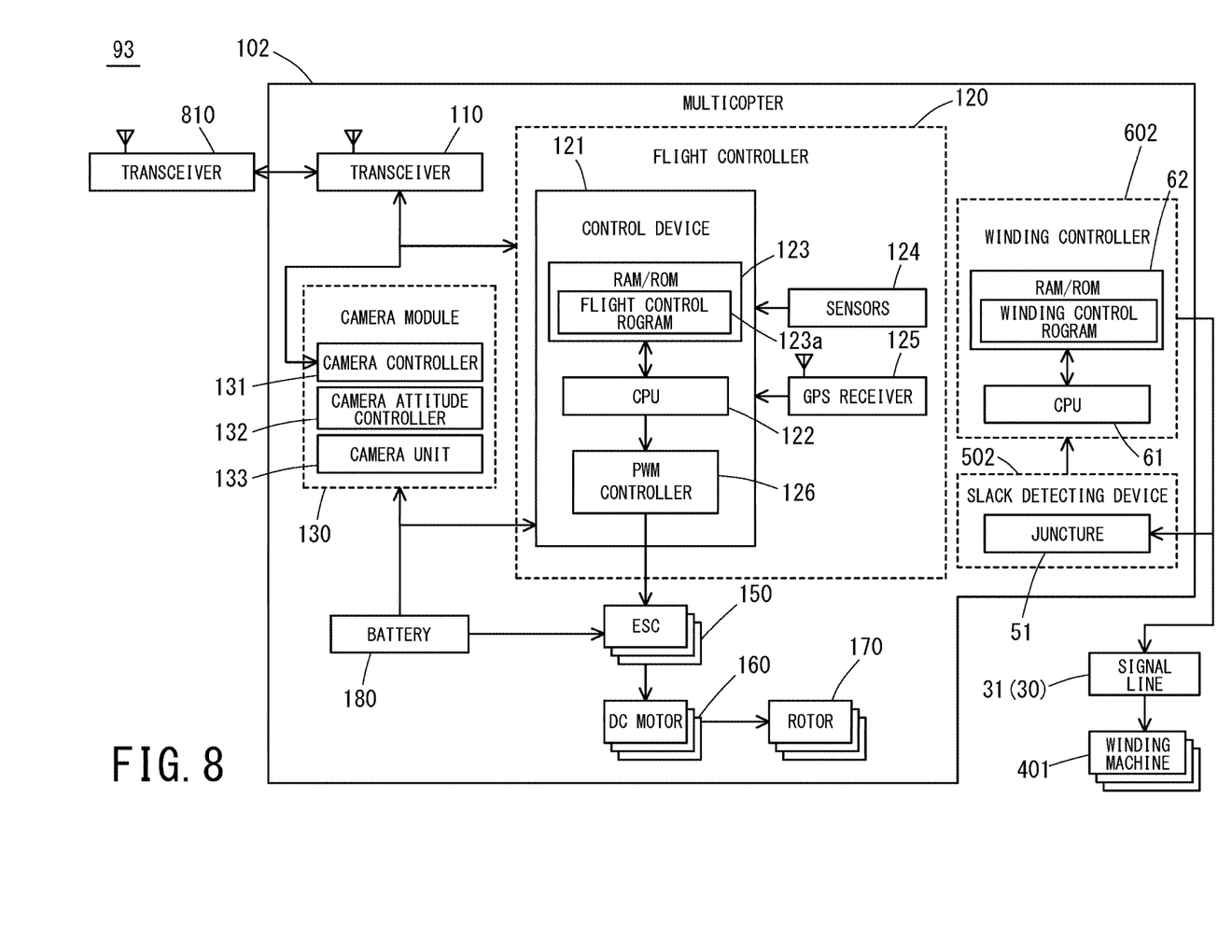
FIG. 8 is a block diagram depicting a functional configuration of the apparatus for controlling a still position in the air pertaining to the fourth embodiment.

The following describes a fourth embodiment pertaining to the apparatus for controlling a still position in the air according to the present invention. FIG. 7 is a schematic diagram depicting an external view of the apparatus 93 for controlling a still position in the air pertaining to the fourth embodiment of the present invention. FIG. 8 is a block diagram depicting a functional configuration of the apparatus 93 for controlling a still position in the air. Now, in the following description, a component having a similar or the same function as in the foregoing embodiments is assigned the same reference designator as in the foregoing embodiments and its detailed description is omitted.

In the apparatus 93 for controlling a still position in the air, a winding controller 602 and a slack detecting device 502 which have functions corresponding to those of the winding controller 601 and the slack detecting device 501 in the foregoing embodiment are provided inside the airframe of the multicopter 102. Also, the multicopter 102 and each of the winding machines 401 are connected with signal lines 31 so as to be able to communicate with each other. Now, instead of the wires 30, the signal lines 31 alone may be connected with the multicopter 102 or the signal lines 31 running together with the wires 30 may be connected with the multicopter 102; in this respect, this embodiment is the same as the foregoing embodiment.

A juncture 51 to which the signal lines 31 are connected is provided on the undersurface of the multicopter 102 (see FIG. 7). The juncture 51 is a member which is able to tilt in a direction in which it is pulled by these signal lines 31 and the juncture 51 constitutes a part of the slack detecting device 502.

Since the signal lines 31 are linked to the juncture 51 provided on the undersurface of the multicopter 102, the juncture 51 will be pulled unevenly by the signal lines 31 when the flight position of the multicopter 102 shifts off the specified position D in a horizontal direction. Thereby, the juncture 51 will tilt in a direction toward which the multicopter 102 is to return, which makes it possible to indicate a direction of the positional shift of the multicopter 102 in a horizontal direction and a slack signal line 31 (see FIG. 9).

As the juncture 51, a structure is conceivable which includes a junction piece which stands upright in a vertical direction by elastomeric force and remains in its position unless external force of a given magnitude is applied to it and a set of variable resistors to detect the tilt direction and the tilt angle of the junction piece; reference can be made to, for example, inter alia, a structure set forth in JP H06-110602 A. Now, the slack detecting device 502 in the present embodiment gives detected slack information only to the winding controller 602; however, the slack detecting device 502 may be configured to give such information to the control device 121 of the flight controller 120 as well. By so configuring the slack detecting device 502, the multicopter 102 is enabled to modify its flight position autonomously and a still position of the multicopter 102 in the air can be controlled more flexibly.

Since the multicopter 102 and each of the winding devices 401 are linked with the signal lines 31 respectively, when slack of any signal line 31 is detected, it is possible to issue an instruction to correct the slack directly from the multicopter 102 to each winding machine 401.

While embodiments of the present invention have been described hereinbefore, the present invention is not limited to the foregoing embodiments and can be modified in various ways without departing from the gist of the present invention.

The invention claimed is:

1. An apparatus for controlling a still position in the air, the apparatus comprising:
    a miniature unmanned aerial vehicle equipped with a plurality of rotors, the miniature unmanned aerial vehicle including an acceleration sensor and an angular velocity sensor and being able to keep its airframe horizontal;
    a stationary plane from which and on which the miniature unmanned aerial vehicle takes off and lands; and
    a plurality of string-like members which link the miniature unmanned aerial vehicle with the stationary plane and which are disposed in spaced places on the stationary plane, wherein:
    lengths of the plurality of string-like members are adjusted before the miniature unmanned aerial vehicle ascends vertically from the stationary plane, such that the plurality of string-like members are stretched to their respective lengths to become tense when the miniature unmanned aerial vehicle has come to a specified position which is a given position in the air, only by ascending vertically from the stationary plane.

2. The apparatus for controlling a still position in the air according to claim 1, wherein
    the plurality of string-like members include at least three string-like members.

3. The apparatus for controlling a still position in the air according to claim 1, wherein
    a power line for supplying electric power to the miniature unmanned aerial vehicle or a signal line for transmitting and receiving signals to/from the miniature unmanned aerial vehicle is included in the plurality of string-like members.

4. An apparatus for controlling a still position in the air, the apparatus comprising:
    a miniature unmanned aerial vehicle equipped with a plurality of rotors, the miniature unmanned aerial vehicle including an acceleration sensor and an angular velocity sensor and being able to keep its airframe horizontal;
    a stationary plane from which and on which the miniature unmanned aerial vehicle takes off and lands; and
    a plurality of string-like members which link the miniature unmanned aerial vehicle with the stationary plane and which are disposed in spaced places on the stationary plane, the plurality of string-like members being stretched to a length for all the members to become tense when the miniature unmanned aerial vehicle has come to a specified position which is a given position in the air;

a plurality of winding machines which are placed on the stationary plane for each of the string-like members and deliver and wind each of the string-like members;

a winding controller which integrally manages operations of the plurality of winding machines; and a slack detecting device which detects slack of the plurality of string-like members, wherein:

when the slack detecting device detects slack of any one of the plurality of string-like members, the winding controller causes all the winding machines to perform a winding operation until the slack string-like member becomes tense.

5. The apparatus for controlling a still position in the air according to claim 4, wherein when the slack string-like member does not become tense even though the string-like member has been wound by a predetermined length, the winding controller increases a speed of winding of all the winding machines.

6. The apparatus for controlling a still position in the air according to claim 4, wherein a juncture to which the plurality of string-like members are linked is provided on an undersurface of the miniature unmanned aerial vehicle;

the juncture is a part of the slack detecting device; and the juncture is able to tilt in a direction in which it is pulled by the plurality of string-like members.

7. The apparatus for controlling a still position in the air according to claim 6, wherein the winding controller and the slack detecting device are provided in the miniature unmanned aerial vehicle; and the miniature unmanned aerial vehicle and the plurality of winding machines are connected with a signal line so as to be able to communicate with each other.

* * * * *